United States Patent [19]

Gazzera et al.

[11] Patent Number: 4,459,121

[45] Date of Patent: Jul. 10, 1984

[54] TORQUE LIMITING CLUTCH

[75] Inventors: Raymond W. Gazzera; John W. Merritt, both of Scottsdale, Ariz.

[73] Assignee: The Garrett Corporation, Los Angeles, Calif.

[21] Appl. No.: 357,517

[22] Filed: Mar. 12, 1982

[51] Int. Cl.³ .............................................. F16D 7/02
[52] U.S. Cl. ........................................ 464/30; 192/77; 464/178
[58] Field of Search ..................... 464/30, 40, 45, 178, 464/99; 192/8 R, 77, 78

[56] References Cited

U.S. PATENT DOCUMENTS

| 550,938 | 12/1895 | Beekman . | |
|---|---|---|---|
| 901,081 | 10/1908 | Dook . | |
| 950,290 | 2/1910 | Hughes | 464/30 X |
| 1,403,052 | 1/1922 | Morrison . | |
| 2,531,744 | 11/1950 | Robbins . | |
| 2,586,359 | 2/1952 | Mall | 464/178 X |
| 2,672,115 | 3/1954 | Conover | 464/45 X |
| 2,847,836 | 8/1958 | Morris | 464/30 X |
| 2,868,001 | 1/1959 | Russell | 464/30 |
| 3,011,372 | 12/1961 | Stumpf . | |
| 3,789,691 | 2/1974 | Zaugg | 464/30 X |
| 3,851,499 | 12/1974 | Noguchi | 464/30 |

Primary Examiner—Stuart S. Levy
Assistant Examiner—Daniel P. Stodola
Attorney, Agent, or Firm—Terry L. Miller; Albert J. Miller

[57] ABSTRACT

A torque limiting clutch having a torque limit which is easily calibrated and relatively constant throughout the service life of the clutch. The clutch includes a pair of rotatable members which are rotatably coupled by resilient friction members yieldably engaging one of the pair of members and securing to the other of the pair of members. The friction elements are configured to achieve substantially uniform friction force and wear along their friction surfaces. According to one embodiment of the invention standard commercial snap rings may be employed as the friction elements.

2 Claims, 3 Drawing Figures

U.S. Patent  Jul. 10, 1984  4,459,121
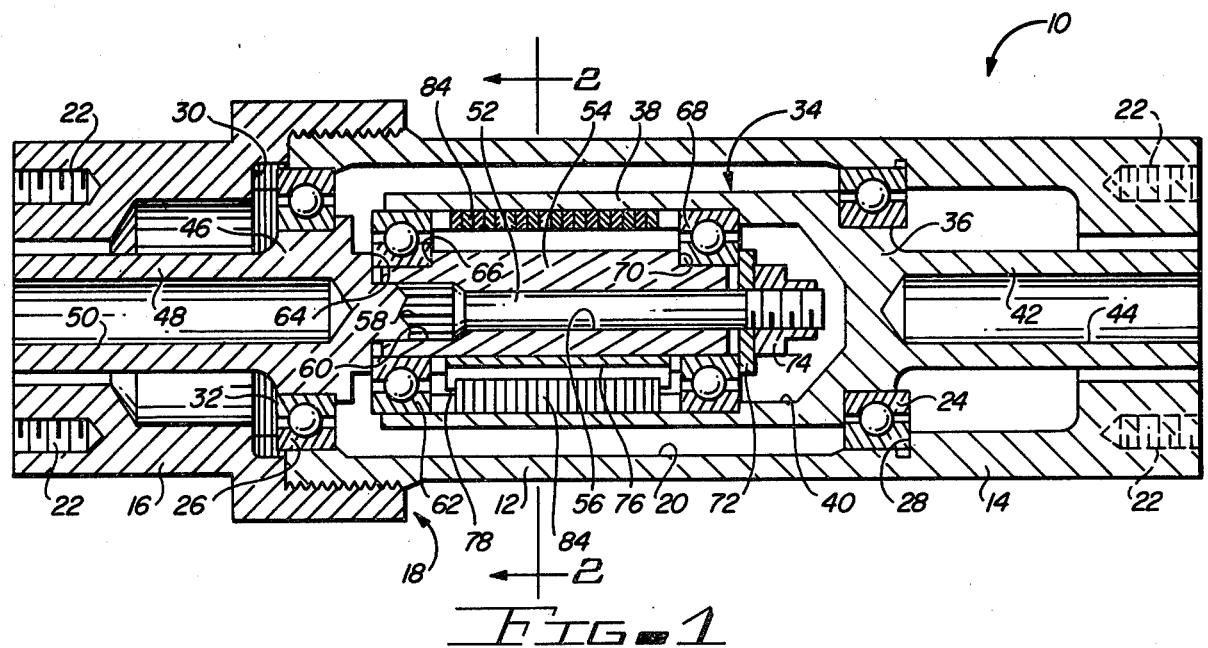
_Fig-1_
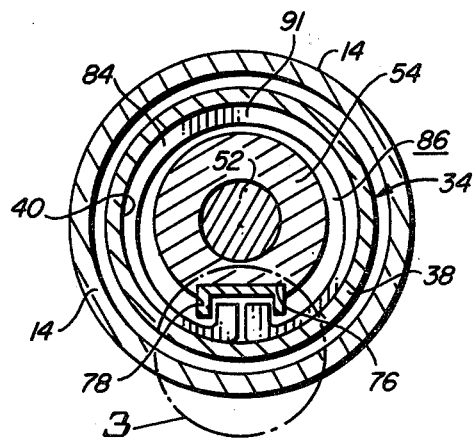
_Fig-2_
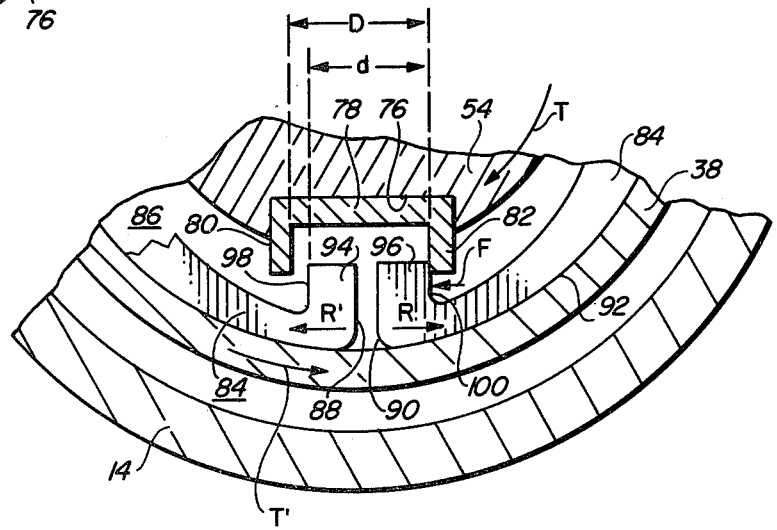
_Fig-3_

TORQUE LIMITING CLUTCH

BACKGROUND AND SUMMARY OF THE INVENTION

This invention relates to a torque limiting clutch. More particularly, this invention relates to a clutch coupling a driven member and a driving member for rotation in unison while transmitting torque therebetween up to a predetermined torque limit of the clutch. When the torque limit of the clutch is reached, the clutch slips to allow relative rotation of the driving and driven members while transmitting the predetermined torque therebetween.

Clutches of this nature find wide application in a variety of mechanical arts. For example, power driven assembly tools which are used to drive threaded fasteners usually incorporate a torque limiting clutch to prevent over tightening of the fasteners. Such clutches also find application in aircraft where they are used in servo systems. Servo systems are used in aircraft to perform a variety of functions. For example, servo systems may be employed to extend and retract the aircraft landing gear or move engine thrust reversing devices between stowed and deployed positions. Further, an aircraft may have servo systems which moves aerodynamic surfaces of the aircraft between selected positions. In all of these illustrative servo systems, and others, torque limiting clutches may be used to prevent damage to the aircraft structure and to the servo system drive train in the event that a jam prevents movement of the system.

In view of the wide application of torque limiting clutches, a number of desirable characteristics for such clutches have been recognized. Among these desirable characteristics are a smooth transition from driving to slipping torque transmission, a repeatable torque limit so that the clutch begins to slip at substantially the same torque time after time, and a mechanically simple and physically rugged clutch structure which is relatively inexpensive to manufacture. Further, a torque limiting clutch should be easily calibrated during manufacture so that compensation may be made for tolerance stack up of its component parts which effect the torque limit of the clutch. Finally, the clutch should be such that wear occurring during the life of the clutch has only an acceptably small effect upon the torque limit of the clutch.

Because of the many desirable characteristics for a torque limiting clutch, conventional clutches of this type have been deficient in one or more respects. Accordingly, it is a primary object for this invention to provide a torque limiting clutch which avoids or ameliorates one or more of the deficiencies of conventional torque limiting clutches.

Another object for this invention is to provide a torque limiting clutch having a driven member and driving member coupled by a multitude of friction elements the number of which may be changed to calibrate the torque limit of the clutch.

Still another object is to provide a method of calibrating a torque limiting clutch according to this invention.

Yet another object is to provide a torque limiting clutch which effects a smooth transition from driving to slipping torque transmission.

Another object for this invention is to provide a torque limiting clutch which has a substantially constant torque limit throughout its service life.

Still another object is to provide a torque limiting clutch which is mechanically simple in construction and physically rugged.

In summary, this invention provides a torque limiting clutch having a number of axially stacked resilient friction elements interposed between a driven member and a driving member. The friction elements are dislorted to resiliently and frictionally engage one of the members and mechanically interlock with the other member. When torque is applied to either one of the members, the resilient elements transmit the torque to the one member. The nature of the interlocking fit of the resilient elements with the other member is such that the transmitted torque urges the resilient elements away from engagement with the one member. So long as the transmitted torque is less than a predetermined value the preload of the resilient elements prevails and relative rotation of the members is prevented. When the transmitted torque reaches the predetermined value, the torque prevails over the preload of the resilient elements so that they slip relative to the one member. Thus, relative rotation of the driving and driven members is permitted while the predetermined torque is transmitted therebetween.

One preferred embodiment of the invention is described in detail below with reference to drawing figures which illustrate only this one preferred embodiment.

BRIEF DESCRIPTION OF THE DRAWINGS

FIG. 1 is an axial cross sectional view of a torque limiting clutch according to the invention;

FIG. 2 is a fragmentary transverse cross sectional view taken along line 2—2 of FIG. 1; and FIG. 3 is an enlarged fragmentary view of an encircled portion of FIG. 2.

DETAILED DESCRIPTION OF THE PREFERRED EMBODIMENT

FIG. 1 illustrates a torque limiting clutch 10 according to a preferred embodiment of the invention. Clutch 10 includes a housing 12 composed of first and second cylindrical parts 14 and 16, respectively, which threadably interconnect at 18. The parts 14 and 16 cooperate to define a stepped bore 20 extending axially through the housing 12. The housing 1 also defines threaded bores 22 by which the clutch 10 may be mounted to driving and driven apparatus (not shown) as by bolts engaging the bores 22. The housing 12 carries a pair of bearings 24, 26 between respective steps 28, 30 on the bore 20. A number of annular shims 32 are interposed between the step 30 and bearing 26 so that the axial preload on bearings 24 and 26 may be adjusted. A clutch assembly 34 is rotatably carried by the bearings 24 and 26.

The clutch assembly 34 includes a cylindrical member 36 having a circumferentially extending wall 38 defining a bore 40. In order to drivingly connect with one of the driving or driven apparatus (not shown), the member 36 includes a hollow stem 42 extending axially to the opening of bore 20 at the right end of clutch 10, viewing FIG. 1. The stem 42 defines a recess 44 which is square in transverse cross section. A shaft of one of the driving or driven apparatus is receivable into the recess 44 to couple with the member 36. The clutch assembly 34 also includes a member 46 having a hollow stem 48 defining a recess 50 which is square in cross section. The stem 48 extends to the opening of the bore 20 at the left end of the clutch 10 to couple with the other of the driving or driven apparatus.

A second stem 52 defined by the member 46 extends rightwardly into the bore 40 of the member 36. The stem 52 carries a spool member 54 defining a bore 56. An externally splined portion 58 of the stem 52 drivingly engages with a matching splined portion 60 of the bore 56. A bearing 62 is captured between a shoulder 64 on the member 46 and a shoulder 66 on the spool member 54. A similar bearing 68 is captured between a shoulder 70 on the spool member 54 and a washer 72 carried by the stem 52. A nut 74 threadably engages the stem 52 and bears against the washer 72 to trap the spool member 54, bearings 62, 68, and washer 72 on the stem 52. The bearings 62, 68 engage the wall 38 of member 36. In view of the above, it is easily understood that the clutch assembly 34 is rotatable within the housing 12 and that the members 36 and 46 of the clutch assembly are relatively rotatable.

Viewing FIGS. 2 and 3, it will be seen that the spool member 54 defines an axially extending groove 76. An elongate channel member 78 is secured in the groove 76, as by welding. The channel member 78 defines a pair of radially and axially extending walls 80 and 82 which are substantially parallel. The walls 80 and 82 cooperate to define a predetermined dimension "D" therebetween.

In order to drivingly couple the members 36 and 46, the clutch assembly 34 includes an axially stacked multitude of relatively thin resilient elements 84. The elements 84 are received in a coannualar chamber 86 which is substantially defined in the bore 40 by the cooperation of wall 38 and spool member 54. The resilient elements 84 are substantially C-shaped and each one defines a pair of confronting ends 88 and 90, viewing FIG. 3. Each of the resilient elements 84 is radially distorted from its unrestrained or free shape in the bore 40. As a result, an outer circumferential surface 92 of each of the elements 84 frictionally engages the wall 38. In other words, the resilient elements 84 in their free shape define an outer diameter which is greater than the inner diameter of the bore 40. As a result, the resilient elements 84 within the bore 40 are yieldably preloaded into frictional engagement with the wall 38 by their own inherent resilience (illustrated by arrows R and $R^1$, viewing FIG. 3).

Further examination of FIGS. 2 and 3 will reveal that the radial dimension of the resilient elements 84 varies circumferentially. The resilient elements 84 define their smallest radial dimension adjacent the ends 88, 90 and circumferentially increase in radial dimension with increasing distance from the ends 88, 90. At a point 91 substantially diametrically opposite the ends 88, 90, viewing FIG. 2, the resilient elements 84 define their maximum radial dimension. Because of the circumferential variation in radial dimension of the resilient elements 84, the radial pressure between the surface 92 of each of the elements 84 and the wall 38 is substantially uniform circumferentially. Additionally, stresses in the resilient elements 84 caused by their distortion in the bore 40 are substantially uniform circumferentially. Thus, it will be understood that the resilient elements 84 engage the member 36 to function as friction elements.

A pair of projections 94, 96 extend radially inwardly from the pair of ends 88, 90, respectively, of each resilient element 84. The projections 94, 96 are received between the walls, 80, 82, of the channel member 78. A pair of radially extending and circumferentially oppositely disposed abutment surfaces 98, 100 are defined by the pair of projections 94, 96, respectively. The abutment surfaces 98, 100 cooperate to define a dimension "d" therebetween, which is less than the dimension "D". The abutment surfaces 98, 100 are engageable with the walls 80, 82, respectively, of the channel member 78. Thus, the resilient elements drivingly interengage with the channel member 78 to couple the elements 84 with the member 46. Regardless of the sense of torque prevailing between the members 36 and 46, after a small possible relative rotation determined by the difference between the dimension "D" and "d", one of the projections 94, 96 engages one of the walls 80, 82 to transmit torque between the members 36 and 46.

Upon examination of the drawing figures it will be seen that the resilient elements 84 bear a strong resemblance to commercially available snap rings of the internal type. In fact, the elements 84 are substantially similar to snap rings. In some applications snap rings may be used in the clutch 10 as the friction elements 84 so that the manufacturing costs of the clutch are significantly reduced. Even in those applications where commercially available snap rings are not appropriate for use in the clutch 10, the similarity of the friction elements 84 to snap rings, for which low-cost manufacturing methods are well established, reduces the cost of the elements 84.

Having observed the structure of clutch 10, attention may now be directed to its operation. When a torque prevails between the two members 36, 46 (as is illustrated by arrows T and $T^1$; viewing FIG. 3) one of the projections 94, 96 of each element 84 engages one of the walls 80, 82 of channel member 78 to couple the member 46 to the elements 84. Thus, one of the driving and driven apparatus (not shown) is coupled with the elements 84 for rotation in unison therewith. The resilient friction elements 84 in turn frictionally couple with the member 36 and with the other of the driving and driven apparatus. As a result, the driving and driven apparatus are coupled for rotation in unison while the clutch 10 transmits torque therebetween.

Viewing FIG. 3, it will be seen that as a result of the torque $T-T^1$ the wall 82 applies a force (represented by arrow F) to the projection 96 of each of the elements 84 in order to transmit torque to the latter. The force F is transmitted circumferentially within the elements 84 and transmitted therefrom to the wall 38 by the frictional engagement therebetween. The end 88 of each friction element is unrestrained; being spaced from the wall 80 by a gap equal to the difference between the dimensions "D" and "d" and also being spaced from the end 90. The force F opposes the resilience R of each element 84 at the end 90 while the torque $T^1$ opposes the resilience $R^1$ of the elements 84 at the end 88. Thus, the torque $T-T^1$ is transmitted between the elements 36, 46 while opposing the inherent resilience of the members 84. (It will be understood that the torque $T-T^1$ and the resilience $R-R^1$ are actually distributed circumferentially rather than localized at the ends 88–90.) Nonetheless, as long as the prevailing torque between the members 36 and 46 is less than a predetermined torque limit of the clutch 10, the resilience of the elements 84 predominates and the members 36, 46 are frictionally coupled for rotation in unison. When the prevailing torque reaches the predetermined torque limit, the torque predominates over the resilience of the elements 84 to urge the latter away from frictional engagement with the wall 38 so that slippage occurs therebetween and results in relative rotation of the members 36, 46.

It will be noted that the torque limit of the clutch 10 is believed to be substantially independent of the friction coefficient between the elements 84 and wall 38 as long as this friction coefficient is above a limiting minimum valve. The torque limit of the clutch is believed to be dependent upon the resilient preload of the elements 84 urging the surface 92 into engagement with the wall 38. Thus, the elements 84 are shaped so that wear occuring during the service life of the clutch 10 has only a small effect upon the preload of the elements against the wall 38 and a small effect upon the torque limit of the clutch.

In view of the above, it is easily perceived that each one of the multitude of elements 84 transmits its prorata share of torque between the members 36, 46. In order to calibrate the torque limit of the clutch 10 lo bring the torque limit thereof within a preselected range, the number of elements 84 in the clutch may be increased or decreased. During manufacture of the clutch 10, the clutch may be assembled with a determined number of elements 84 therein and tested to ascertain its torque limit. If the torque limit of the clutch is outside of the preselected range, the number of elements 84 in the clutch may be increased or decreased according to the deviation of the torque limit from the preselected torque range. If desired, the clutch may again be tested to assure that the torque limit has been brought within the preselected range. Moreover, during serial production of clutches according to this invention the determined number of elements 84 initially placed in each clutch may be adjusted in view of an iteration as described above so that few of the clutches will require further addition or removal of resilient elements in order for their torque limit to fall within the preselected range.

Additionally, it is easily perceived that the clutch 10 is bidirectional. That is, the elements 36, 46 may be driven in either direction with the wall 80 or 82 of channel member 78 engaging the appropriate projection 94 or 96 of the resilient elements 84 so that the torque limit of the clutch is substantially uneffected by the direction of rotation. Further, either of the members 36, 46 may connect to the driving apparatus with the other of the members 36, 46 connecting to the driven apparatus. In other words, the torque limit of the clutch 10 is substantially uneffected by which of the members 36, 46 is driving and which is driven.

While this invention has been described with reference to a preferred embodiment thereof, no limitation upon the invention should be implied because of such reference. Many modifications, changes, and alterations to the preferred embodiment of the invention will suggest themselves to those skilled in the pertinent art. Such equivalents of the invention are intended to fall within the scope and spirit of the appended claims which alone define and limit the invention.

We claim:

1. A torque limiting clutch comprising:

an elongate housing defining an axially extending bore therethrough which opens on opposite ends of said housing;

an elongate clutch assembly rotatably carried within said bore of said housing, said clutch assembly including a pair of axially aligning relatively rotatable members, one of said pair of relatively rotatable members including a circumferentially extending wall defining an axially extending cylindrical cavity, said one member further defining a first stem extending axially to said bore opening at one of said opposite ends of said housing, said first stem defining first means for engaging with one of a driving and driven apparatus;

the other of said pair of relatively rotatable members defining a second stem extending axially to the bore opening at the other of said opposite ends of said housing, said second stem defining second means for engaging with the other of said driving and driven apparatus, said other member further defining a third stem extending axially into said cavity of said one member; a spool member carried upon third stem and drivingly coupled with said other member, said spool member defining an axially extending groove opening radially outwardly;

an elongate substantially U-shaped channel member secured in said groove, said channel member defining a pair of axially and radially outwardly extending walls which are substantially parallel and circumferentially spaced apart, said pair of walls cooperating to define a determined distance therebetween;

a multitude of axially stacked resilient friction elements received in said cavity of said one member and circumscribing said spool member, each one of said friction elements being substantially C-shaped and defining a pair of spaced apart confronting ends and a radially outwardly disposed circumferentially extending friction surface, said friction elements in their free shape defining a diameter at said friction surface which is larger than the diameter of said cylindrical cavity, said friction elements being radially distorted within said cavity so that said friction surface is yieldably biased into engagement with said wall by the resilience of said friction members, each of said friction elements defining a pair of projections extending radially inwardly adjacent said pair of confronting ends thereof, each pair of said projections being received between said pair of walls of said channel member and defining a pair of circumferentially oppositely disposed abutment surfaces which are engageable with said pair of walls to drivingly couple said friction elements to said other member, said pair of abutment surfaces cooperating to define a predetermined distance therebetween which is less than said determined distance.

2. The invention of claim 1 wherein said friction elements define a radial dimension which is circumferentially variant, said radial dimension being a minimum value adjacent said pair of confronting ends and increasing circumferentially to a maximum value at a point substantially diametrically opposite said pair of confronting ends.

* * * * *

UNITED STATES PATENT AND TRADEMARK OFFICE
CERTIFICATE OF CORRECTION

PATENT NO. : 4,459,121

DATED : July 10, 1984

INVENTOR(S) : Raymond W. Gazzera et al

It is certified that error appears in the above–identified patent and that said Letters Patent are hereby corrected as shown below:

Column 5, line 18, following "clutch 10", delete "lo", and insert --to--.

*Signed and Sealed this*

*Twenty-sixth* Day of *February 1985*

[SEAL]

*Attest:*

DONALD J. QUIGG

*Attesting Officer*     *Acting Commissioner of Patents and Trademarks*